US009511946B2

(12) United States Patent
Palumbo

(10) Patent No.: US 9,511,946 B2
(45) Date of Patent: Dec. 6, 2016

(54) MACHINE FOR DECORATING PRODUCTS

(71) Applicant: Projecta Engineering S.r.L., Fiorano Modenese (Modena) (IT)

(72) Inventor: Vincenzo Palumbo, Castellarano (IT)

(73) Assignee: PROJECTA ENGINEERING S.R.L., Fiorano Modenese (Modena) (IT)

( * ) Notice: Subject to any disclaimer, the term of this patent is extended or adjusted under 35 U.S.C. 154(b) by 0 days.

(21) Appl. No.: 14/367,143

(22) PCT Filed: Nov. 16, 2012

(86) PCT No.: PCT/IB2012/056484
§ 371 (c)(1),
(2) Date: Jun. 19, 2014

(87) PCT Pub. No.: WO2013/093668
PCT Pub. Date: Jun. 27, 2013

(65) Prior Publication Data
US 2014/0345519 A1 Nov. 27, 2014

(30) Foreign Application Priority Data
Dec. 20, 2011 (IT) .............................. VR2011A0228

(51) Int. Cl.
B05B 13/02 (2006.01)
B05C 13/02 (2006.01)
B05B 7/06 (2006.01)
B65G 21/10 (2006.01)
B65G 37/00 (2006.01)
B28B 11/00 (2006.01)
B28B 11/04 (2006.01)
(Continued)

(52) U.S. Cl.
CPC ........... B65G 37/00 (2013.01); B05B 13/0221 (2013.01); B05C 13/02 (2013.01); B28B 11/001 (2013.01); B28B 11/048 (2013.01); B41J 3/407 (2013.01); B41J 11/007 (2013.01)

(58) Field of Classification Search
USPC .... 118/324, 313–315; 347/102, 104, 2, 106, 347/16; 101/488; 198/586
See application file for complete search history.

(56) References Cited

U.S. PATENT DOCUMENTS 8,205,736 B2 * 6/2012 Ando .................... B41F 17/005
101/93.01
2007/0146458 A1 * 6/2007 Perego ......................... 347/102
2010/0122634 A1 * 5/2010 Doyle ................ H05K 13/0061
101/126

FOREIGN PATENT DOCUMENTS

EP 1038689 A1 9/2000
EP 2404724 A1 1/2012
(Continued)

OTHER PUBLICATIONS

International Search Report dated Jul. 6, 2013 for International Application No. PCT/IB2012/056484.
(Continued)

Primary Examiner — Yewebdar Tadesse
(74) Attorney, Agent, or Firm — Tutunjian & Bitetto, P.C.

(57) ABSTRACT

A machine for decorating products, including an area for printing products and an area for supporting products arranged beneath said printing area, including a moveable frame to which the support area and the printing area are integrally joined, the support area including a first conveyor, directly positioned of the printing area, and a second conveyor positioned beneath the first conveyor.

12 Claims, 3 Drawing Sheets

(51) Int. Cl.
  *B41J 3/407*  (2006.01)
  *B41J 11/00*  (2006.01)

(56)  References Cited

FOREIGN PATENT DOCUMENTS

EP  2492098 A1  8/2012
  WO  WO2006027212 A1  3/2006

OTHER PUBLICATIONS www.siti-bt.com, Keramagic, XP055043140, Jun. 26, 2011, 2 pages.
www.siti-bt.com, Evolve, XP055043118, Feb. 28, 2012, 2 Pages.

* cited by examiner

MACHINE FOR DECORATING PRODUCTS

BACKGROUND

Technical Field of the Invention

The present invention regards a machine for decorating products.

More in particular, the present invention regards a machine for decorating products such as ceramic tiles and the like.

Description of Related Art

In various industries, such as for example that of producing ceramic tiles and the like, machines for providing surface decorations of high quality and repeatability are used.

These machines typically comprise one or more printing bars, for example one per each colour with which the decoration is obtained, each provided with heads provided with a high number of nozzles which dispense micro-drops of a given fluid—for example an ink or a enamel—which is deposited on the surface of the tile or of the product to be decorated.

The products to be decorated are usually advanced on a belt, or other equivalent means, in an area beneath the heads of the machine, so as to pass in proximity of the nozzles of the latter for the period of time required to deposit the micro-drops of the decorating fluid.

A machine of the aforementioned type is described, for example, in the patent application n° RE2011A000012 having the title "Dispositivo di stampa policroma a getto d'inchiostro, per superfici piane".

Such machines are usually installed within decoration lines suitable for processing different products and/or perform various decoration techniques, and thus in some cases there may be required the use thereof, while in other cases they are not used and thus they may be bypassed.

In other cases, the aforementioned decoration lines may comprise several machines of the type described above, each of which is adapted to execute a different step of the decoration application process.

Depending on the type of decoration process to be carried out, which obviously varies case by case, some machines may be used while others may be left temporarily inactive so as to obtain maximum versatility of the decoration line to meet all the needs.

For this reason, it is required to provide lines for conveying products which connect the various machines so that each machine may be reached and traversed by the products or left inactive where necessary.

This need implies providing complex conveyor lines, which are expensive and difficult to control and manage.

SUMMARY OF THE INVENTION

Thus, the technical task of the present invention is that of improving the state of the art.

Within this technical task, providing a machine for decorating products adapted to be used when required and be bypassed by the products when kept inactive, thus without having to modify the layout of the conveyor line represents an object of the present invention.

This task and this object are attained by the machine for decorating products according to the present principles.

The machine comprises an area for printing the products and an area for supporting products arranged beneath the printing area; the machine also comprises a moveable framework to which the support area and the printing area are integrally joined.

According to an aspect of the invention, the support area comprises a first conveyor positioned directly below the printing area, and a second conveyor positioned below the first conveyor.

The machine also comprises means for translating the moveable framework from a lower operating position of the first conveyor and inactive position of the second conveyor, to an upper operating position of the second conveyor and inactive position of the first conveyor, and vice versa.

In this manner, the first conveyor or the second conveyor may be selectively aligned to an external conveyor line, so as to respectively move the products through the printing area so as to perform the decorations or so as to bypass the machine without performing decorations.

Further characteristics and advantages are described in the dependent claims.

BRIEF DESCRIPTION OF THE DRAWINGS

The characteristics of the invention shall be better understood by any man skilled in the art from the description that follows and from the attached drawings, provided by way of non-limiting example, wherein.

DETAILED DESCRIPTION OF THE INVENTION

Figure 1:
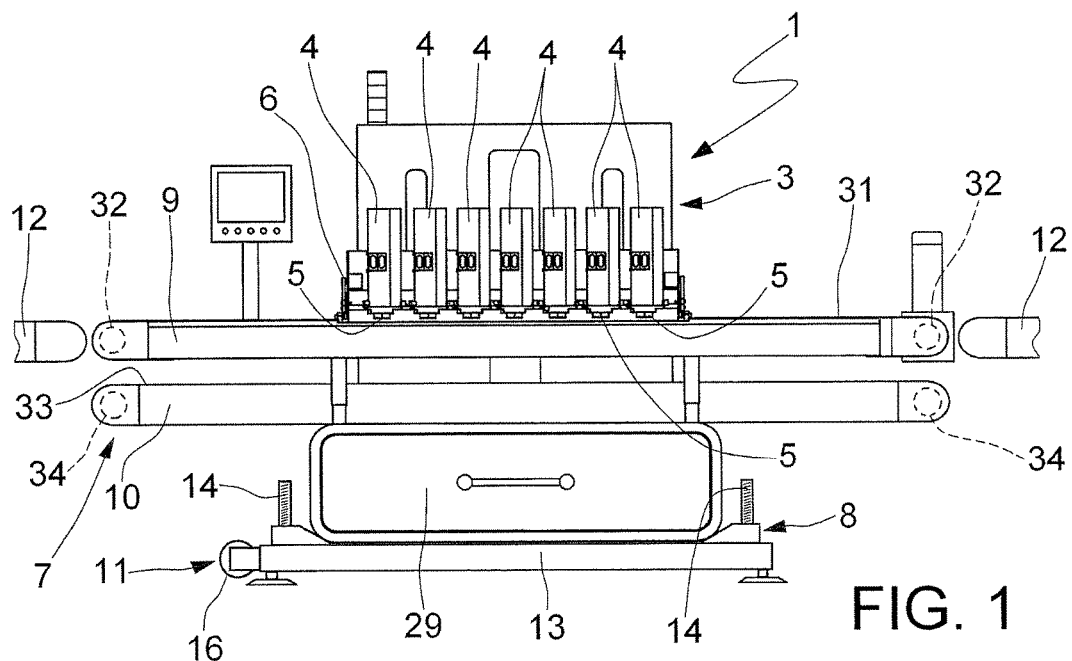
FIG. 1 is a front view of the machine according to the invention, in a first operating configuration.

With reference to the attached FIG. 1, a machine for decorating products according to the present invention is indicated in its entirety with 1.

The machine is particularly, but not exclusively, intended to be used for decorating flat products such as for example ceramic tiles, or other similar products.

However, it should be observed that the machine could also be used for decorating products of any other kind, i.e. any shape and made of any material, without limiting the objects of the present invention in any manner whatsoever.

The machine 1 comprises, in a per se known manner, a base, indicated in its entirety with 2, for example comprising a cabinet which houses the components of the machine, and other support parts.

The machine 1 further comprises a printing area, indicated in its entirety with 3.

The printing area 3 comprises at least one printing bar 4, provided with at least one respective head 5 with a plurality of nozzles for ejecting a decorating fluid.

The heads 5 of each printing bar 4 are of the type per se known in the industry and thus they shall not be described further in detail, same case applying to the operating modes thereof for applying decorating fluids—for example ink, enamel, and the like—on flat products such as ceramic tiles and the like.

More in particular, the printing area 3 comprises a plurality of adjacent printing bars 4, each intended to apply a respective type of decorating fluid, for example a given ink colour, a given type of enamel, etcetera on the products.

Figure 2:
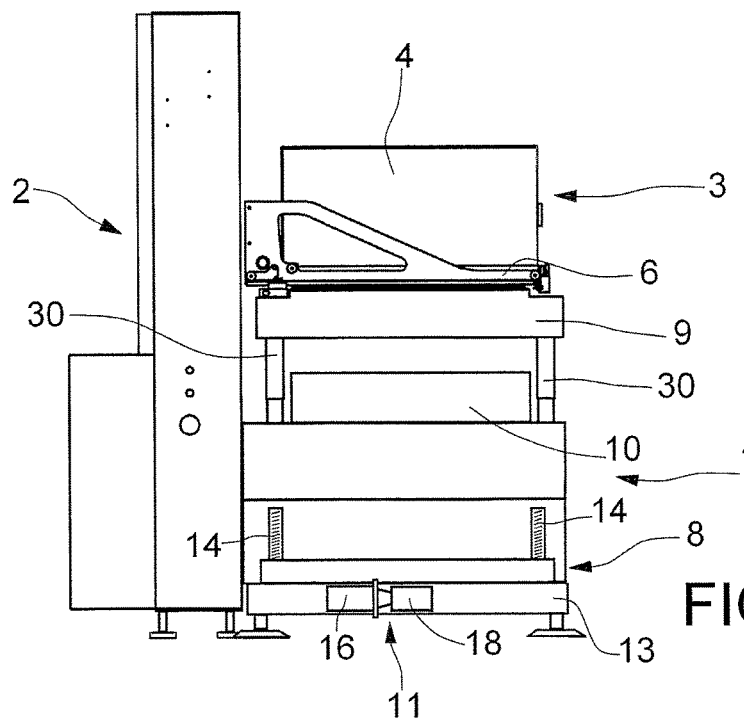
FIG. 2 is a lateral view of the machine.

As observable for example in FIG. 2, the printing area comprises a framework 6 substantially configured bracket-like which supports the printing bars 4.

The printing bars 4 may for example be mounted on respective supports fixed, in a rigid or sliding manner, on the framework 6. The supports may, for example, comprise respective tanks for the decorating fluid, as well as electrical and/or pneumatic connections to means for actuating heads 5 of the known type.

The machine 1 further comprises an area for supporting of the products to be decorated indicated in its entirety with 7. The support area 7 is arranged beneath the printing bar 4 or printing bars 4 of the printing area 3. According to an aspect of the present invention, the machine 1 comprises a moveable frame 8.

The support area 7 and the printing area 3 are integrally joined to the moveable frame 8.

According to another aspect of the present invention, the support area 7 comprises a first conveyor 9 for products, positioned directly beneath the printing area 3.

The first conveyor 9 is adapted to move the products required to be subjected to decoration by means of the printing bars 4 through the machine 1, as clarified hereinafter.

The support area 7 further comprises a second conveyor 10 for products, positioned beneath the first conveyor 9.

The second conveyor 10 is adapted to move the products that do not require to be subjected to decoration, i.e. in other words need to bypass the machine, through the machine 1, as clarified hereinafter.

According to a further aspect of the present invention, the machine comprises means 11 for translating the moveable frame 8 from a lower operating position of the first conveyor 9 and inactive position of the second conveyor 10, to an upper operating position of the second conveyor 10 and inactive position of the first conveyor 9, and vice versa.

FIG. 1 illustrates the moveable frame 8 in the aforementioned lower position.

As illustrated, in this position the first conveyor 9 is in the operating condition, i.e. it is aligned with the external conveyor line 12, in particular comprising two belts one of which upstream and one downstream of the machine 1. In this manner, the products pass on the first conveyor 9 and thus the decoration is applied thereonto by the printing bars 4.

The second conveyor 10 is instead in inactive condition, i.e. the products do not pass thereon.

FIG. 2, instead, illustrates the moveable frame 8 in the aforementioned upper position.

In this position, the first conveyor 9 is in inactive position, i.e. the products do not pass thereon.

The second conveyor 10 is instead in operating condition, i.e. it is aligned with the external conveyor line 12.

In this manner, the products pass on the second conveyor 10 and thus no decoration is applied thereon. In other words, the products bypass the machine 1.

More in detail, said translating means 11 comprise a base 13 provided for beneath the support area 7.

The translating means 11 further comprise a plurality of screws 14, or threaded bars, rotatably supported with vertical axis in the base 13, on thrust bearings.

The translating means 11 also comprise a respective plurality of nut screws 15 coupled to the screws 14, and integral with the moveable frame 8.

Figure 5:
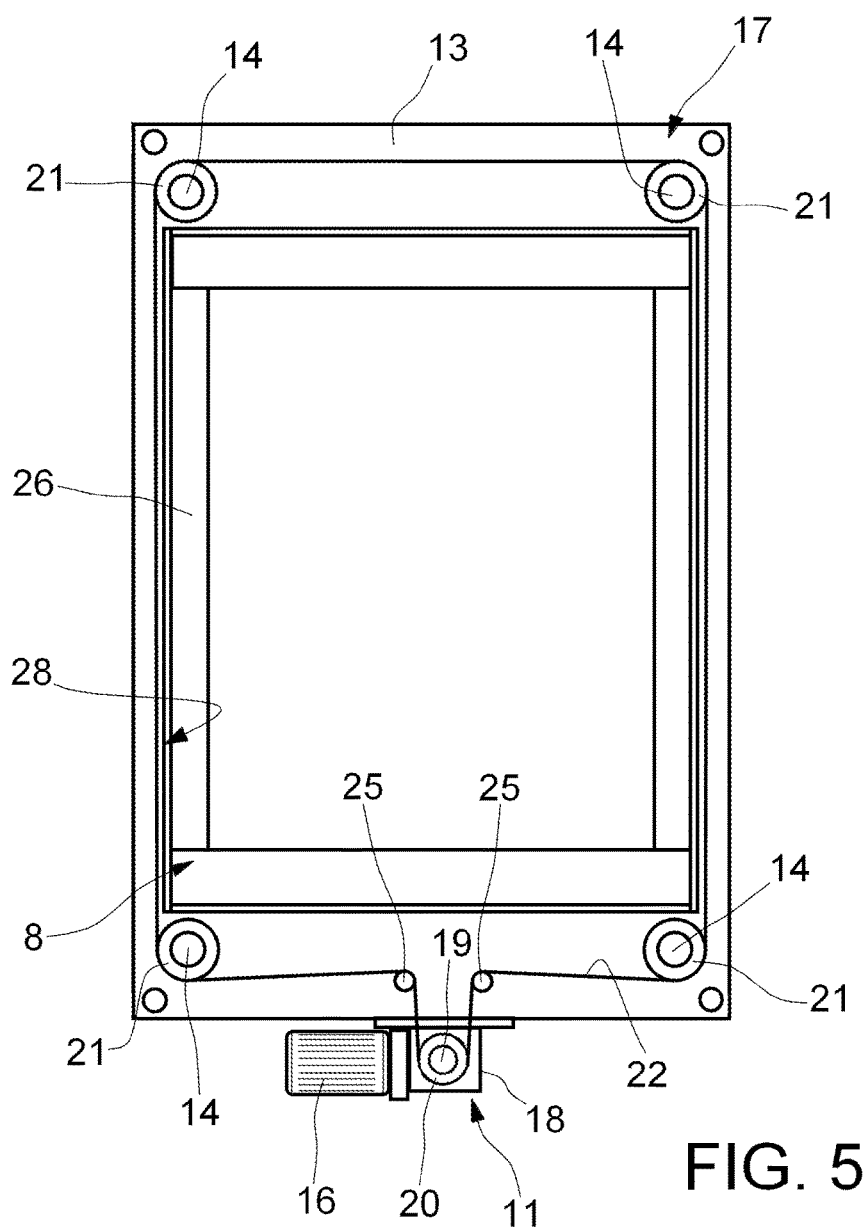
FIG. 5 is a bottom and detailed view of the machine according to the invention.

The translating means 11 comprise a motor 16 fixed to the base 13, and transmission members, indicated in their entirety with 17 in FIG. 5, which mechanically connect the motor 16 to the screws 14.

The motor 16 is operatively connected to a machine operation control unit.

Due to this solution a single motor 16 actuates the simultaneous rotation of all the screws 14, in an accurately synchronised manner, so that the coupling with the respective nut screw 15 of the moveable frame 8 determines the vertical translation of the latter, towards the other or downwards depending on the direction of rotation of the motor 16.

There may be provided means for the fine adjustment of the rotation of the screws 14, with possible recovery of clearance, so as to obtain a perfect horizontal position of the moveable frame 8 during the translation thereof.

The motor 16 comprises a respective speed reducer 18, having an output shaft 19.

More in particular, the transmission members 17 comprise a crown 20 integrally joined with the output shaft 19 of the motor 16, a plurality of pinions 21 respectively integrally joined with the screws 14 and a chain 22 meshing with the crown 20 and with the pinions 21.

This solution is illustrated in detail in the bottom view of FIG. 5.

Figure 4:
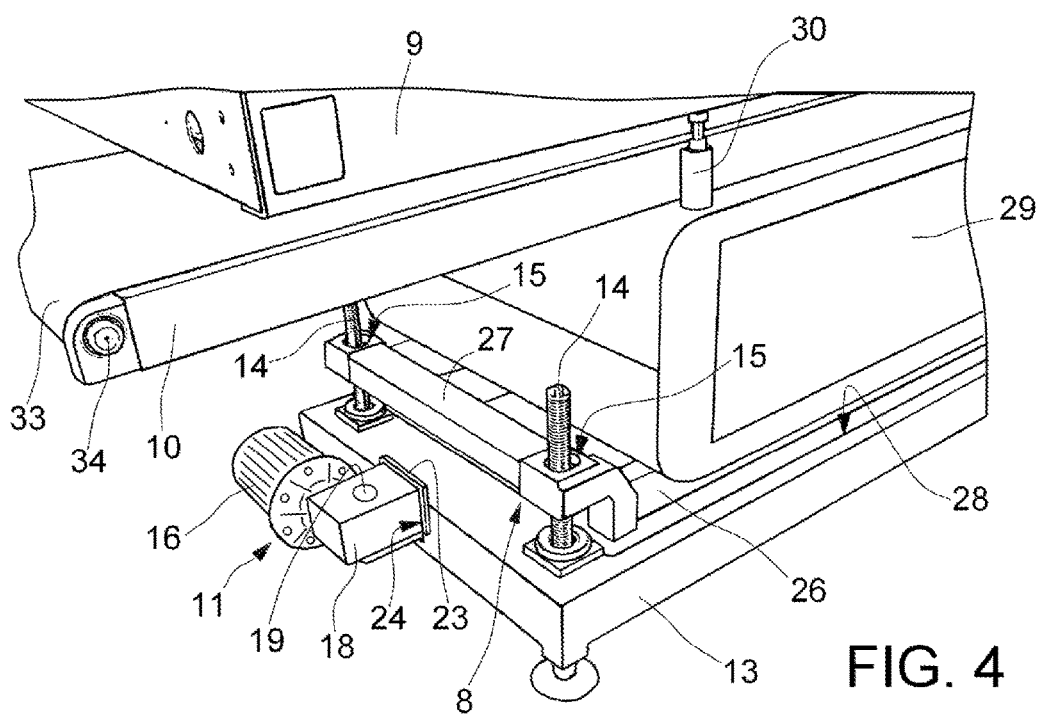
FIG. 4 is a perspective detailed view of the machine.

As observable also in FIG. 4, the motor 16 is fixed to the external surface of the base 13, in particular to a flange 23.

The base 13 thus comprises a through-window 24 for the passage of the chain 22 towards the other transmission members 17.

The transmission members 17 also comprise two pulleys 25, rotatably supported in the base 13 at the through-window 24, which allow the correct winding of the chain 22 around the pinions 21 and the crown 20.

In other embodiments, the transmission members 17 may also be of any other equivalent type, for example they comprise pulleys and belts, instead of crowns, pinions and chains.

The transmission members 17 could also be of the gear type.

The base 13 and the moveable framework are substantially quadrangular—for example rectangular—respectively with the screws 14 and the nut screws 15 provided at the corners.

The moveable frame 8, comprises a lower portion 26 and two opposite raised edges 27 in which the nut screws 15 are provided.

Correspondingly, the base 13 comprises a central opening 28 in which the lower portion 26 of the moveable frame 8 is intended to be inserted, when it is in the lower position, as illustrated in FIG. 1.

This solution allows optimally exploiting the available height: actually, in the lower position, the moveable frame 8 projects at the upper part solely minimally with respect to the base 13.

A drawer box-shaped element 29, which can be used for housing, for example, various containers for decorating fluids, machine spare parts, various equipment or other elements, is supported on the moveable frame 8 in a per se known manner.

The box-shaped element 29 comprises adjustable screw supports 30 on which the first conveyor 9 lies; the second conveyor 10 is also directly supported on the boxed-shaped element 29.

The first conveyor 9 comprises a first belt 31 closed loop-like on respective first rollers 32, actuated by a respective gearmotor unit connected to the control unit of the machine.

The first conveyor 9 may be of any other equivalent type. The second conveyor 10 analogously comprises a second belt 33 closed loop-like on respective second rollers 34, actuated by a respective gearmotor unit, independent from that of the first conveyor 9, connected to the control unit of the machine.

Also the second conveyor 10 may be of any other equivalent type.

In light of what has been described above the operation of the machine according to the invention is entirely intuitive, same case applying to the technical advantages attained by the invention.

As mentioned, the machine 1 is usually inserted in the context of a decoration line in which the products to be decorated pass with a continuous flow on the external conveyor line 12.

As mentioned, when the moveable frame 8 is located in the lower position of FIG. 1, the products pass on the first conveyor 9 of the machine 1 and thus the decoration is carried out thereon through the printing bars 4, in a per se known manner and which will not be described hereinafter further in detail.

Figure 3:
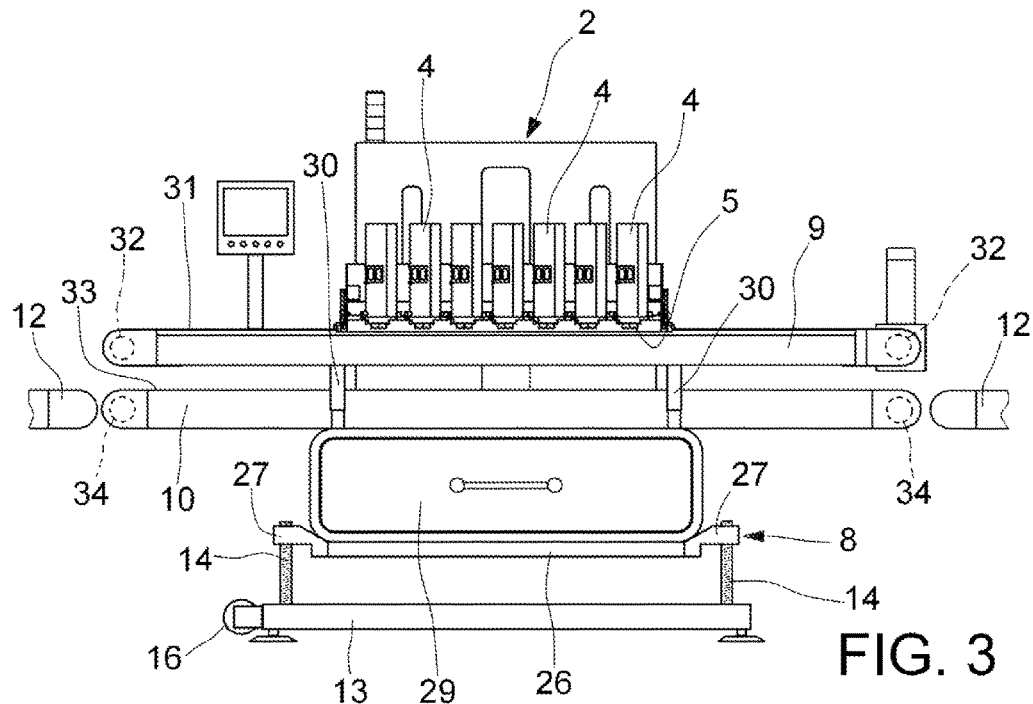
FIG. 3 is a front view of the machine in a second operating configuration.

Should the machine 1 not be used temporarily or for a given period of time, the moveable frame 8 is brought, through translating means 11, in the upper position of FIG. 3. In this condition, the products pass on the second conveyor 10 and no longer on the first conveyor 9: thus, the products pass through the machine 1 without being subjected to any decoration, and they are thus directed towards the external conveyor 12.

Thus, due to this solution the machine 1 may be selectively activated or excluded from the decoration line, without having to perform any modification to the line for conveying the products, and additionally without having to stop the operation of the printing area 3.

The proposed solution is extremely simple and inexpensive, given that the single motor 16 allows actuating all screws 14 to which the moveable frame work is coupled. Also the control of the translation of the moveable frame 8 is simple and practical, given that it is required to manage the operation of a single motor 16.

Maintenance is facilitated by the fact that the translating means 11 are provided at the base 13.

The translation of the moveable frame 8 performed through screws 14 coupled to respective nut screws 15 allows a very accurate positioning of the first conveyor 9 or of the second conveyor 10, so as to compensate possible different heights or other inaccuracies when mounting the machine.

In addition, the proposed solution is solid and reliable given that the screws 14 are mounted on respective thrust bearings positioned in the base 13.

The printing bars 4, even in cases where the machine is not used temporarily, i.e. in the case where the products pass on the second conveyor 10, they remain operative, this being particularly advantageous should the decorating fluid be maintained continuously in circulation.

In alternative embodiments, the motor 16 may be coupled to the nut screws 15 with transmission members 17 entirely equivalent to the described ones, while the screws 14 may be fixed to the base 13, obtaining an equivalent kinematic motion inversion.

In some particular applications, the first conveyor 9 and the second conveyor 10 may be used simultaneously, so as to subject parts of the passing products to the application of decoration on the first conveyor 9, and simultaneously move another part of products, not to be subjected to decoration, through the second conveyor 10.

For this purpose, the external conveyor line 12 should be provided with suitable ramifications and deviations so as to carry the products both at the first conveyor 9 and at the second conveyor 10.

Lastly, it should be observed that the translating means 11 of the moveable frame 8 may even be of any other type, for example made of pneumatic, hydraulic, electrical actuators, or of any other equivalent type.

It has thus been observed that the invention attains the proposed objects.

The present invention was described according to preferred embodiments; however equivalent variants may be conceived without departing from the scope of protection provided for by the claims that follow.

The invention claimed is:

1. A machine for decorating products, comprising:
   a printing area of the products;
   a support area of the products arranged beneath said printing area, wherein the machine
   further comprises a mobile frame to which said support area and said printing area are fixedly connected, said support area comprising a first conveyor, positioned directly beneath said printing area, and a second conveyor positioned below said first conveyor; and
   a translation means for translating said mobile frame from an operative lower position of said first conveyor and inactive position of said second conveyor to an operative upper position of said second conveyor and inactive position of said first conveyor, and vice-versa,
   wherein said translation means comprise a base provided beneath the support area and means for actuating said mobile frame with respect to said base along a vertical direction.

2. The machine according to claim 1, wherein said translation means includes a plurality of threaded screws rotatably supported with a vertical axis in said base and a respective plurality of nut screws coupled to said threaded screws and fixedly connected to said mobile frame.

3. The machine according to claim 2, wherein said translation means further comprise a motor fixed to said base and transmission members that connect said motor to said threaded screws.

4. The machine according to claim 3, wherein said transmission members comprise a crown fixedly connected to the output shaft of said motor, a plurality of pinions respectively fixedly connected to said threaded screws and a chain engaging with said crown and said pinions.

5. The machine according to claim 4, wherein said motor is fixed to the outer surface of said base, the latter comprising a through-window for said chain or belt.

6. The machine according to claim 3, wherein said transmission members comprise pulleys fixedly connected to the output shaft of said motor and to said threaded screws, and a belt engaging with said pulleys.

7. The machine according to claim 2, wherein said base and said mobile frame are substantially quadrangular, respectively with said threaded screws and nut screws foreseen at the corners.

8. The machine according to claim 7, wherein said base comprises the central opening into which the lower portion of said mobile frame is inserted when said mobile frame is in said operative lower position.

9. The machine according to claim 7, wherein said mobile frame comprises two opposite raised edges in which said nut screws are foreseen.

10. The machine according to claim 2, wherein said printing area comprises at least one printing bar equipped with at least one respective head with a plurality of nozzles for ejecting a decorative fluid on the surface of the products.

11. The machine according to claim 1, wherein said first conveyor and said second conveyor respectively comprise a first belt closed in a loop on respective first rollers and a second belt closed in a loop on respective second rollers.

12. A machine for decorating products, comprising:
 a printing area of the products and a support area of the products arranged below said printing area, wherein the machine further comprises:
 a mobile frame to which said support area and said printing area are fixedly connected, said support area comprising a first conveyor, positioned directly below said printing area:
 a second conveyor positioned below said first conveyor, and wherein said first conveyor and said second conveyor respectively comprise a first belt closed in a loop on respective first rollers and a second belt closed in a loop on respective second rollers; and
 a translation means for translating said mobile frame from an operative lower position of said first conveyor and inactive position of said second conveyor to an operative upper position of said second conveyor and inactive position of said first conveyor, and vice-versa,
 wherein said translation means comprise a base provided beneath the support area and means for actuating said mobile frame with respect to said base.

* * * * *